(12) United States Patent
Wada (10) Patent No.: US 12,305,884 B2
(45) Date of Patent: May 20, 2025

(54) HEAT EXCHANGER AND WATER HEATER EQUIPPED WITH THE SAME

(71) Applicant: NORITZ CORPORATION, Hyogo (JP)

(72) Inventor: Norihide Wada, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 253 days.

(21) Appl. No.: 18/166,445

(22) Filed: Feb. 8, 2023

(65) Prior Publication Data

US 2023/0272942 A1  Aug. 31, 2023

(30) Foreign Application Priority Data

Feb. 25, 2022 (JP) .................................. 2022-027740

(51) Int. Cl.
  *F24H 9/00* (2022.01)
  *F24H 1/10* (2022.01)

(52) U.S. Cl.
  CPC .......... *F24H 1/107* (2013.01); *F24H 9/0026* (2013.01)

(58) Field of Classification Search
  CPC ...... F28D 7/082; F28D 7/0075; F28D 7/1623; F28D 7/0083; F24H 9/00; F24H 9/0031; F28F 1/24; F28F 9/001; F28F 9/02; F28F 9/002
  See application file for complete search history.

(56) References Cited

U.S. PATENT DOCUMENTS

| | | | | |
|---|---|---|---|---|
| 10,012,411 B2* | 7/2018 | Umakoshi | .............. | F24H 1/165 |
| 10,094,589 B2* | 10/2018 | Oohigashi | ................ | F24H 1/14 |
| 11,624,526 B2* | 4/2023 | Horiuchi | ................ | F28F 1/325 |
| | | | | 122/355 |
| 2021/0247100 A1* | 8/2021 | Ohigashi | .............. | F28D 7/0075 |

FOREIGN PATENT DOCUMENTS

| | | | | |
|---|---|---|---|---|
| CN | 118274635 A | * | 7/2024 | ............. F24H 1/145 |
| JP | 2015132416 A | * | 7/2015 | |
| JP | 2017116203 | | 6/2017 | |
| JP | 2020003108 | | 1/2020 | |
| JP | 2020003108 A | * | 1/2020 | .............. F24H 1/14 |
| JP | 7199636 B2 | * | 1/2023 | ............. F24H 1/107 |
| JP | 2023124137 A | * | 9/2023 | ............. F24H 1/107 |
| KR | 102467664 B1 | * | 11/2022 | |

* cited by examiner

*Primary Examiner* — Gregory A Wilson
(74) *Attorney, Agent, or Firm* — JCIPRNET (57) ABSTRACT

A heat exchanger and a water heater are provided. The heat exchanger is provided with an auxiliary member including a trunk pipe joint portion joined to a trunk pipe and an extension portion extending from the trunk pipe joint portion toward a plurality of fins. The plurality of fins is provided apart from a sidewall portion so as not to directly contact the sidewall portion of a case, the extension portion of the auxiliary member includes an entry portion that enters between the plurality of fins and the sidewall portion, and a first abutment portion which is provided in the entry portion and abuts outer end portions of the plurality of fins, the first abutment portion is separated from the sidewall portion, and a space portion in which inflow of the heating gas is suppressed is formed between the first abutment portion and the sidewall portion.

6 Claims, 6 Drawing Sheets

HEAT EXCHANGER AND WATER HEATER EQUIPPED WITH THE SAME

CROSS-REFERENCE TO RELATED APPLICATION

This application claims the priority benefits of Japanese application no. 2022-027740, filed on Feb. 25, 2022. The entirety of the above-mentioned patent application is hereby incorporated by reference herein and made a part of this specification.

BACKGROUND

Technical Field

The disclosure relates to a heat exchanger of a type that recovers heat from a heating gas such as a combustion gas and a water heater such as a hot-water supply device equipped with the same.

Description of Related Art

Examples of water heaters are described in Patent Documents 1 (Japanese Patent Laid-Open No. 2017-116203) and 2 (Japanese Patent Laid-Open No. 2020-3108).

The water heater disclosed in Patent Document 1 includes a burner and a heat exchanger, and the heat exchanger includes a case into which a combustion gas generated by the burner is supplied, a heat transfer pipe with a plurality of fins disposed in the case, and a trunk pipe. The trunk pipe is located further upstream than the heat transfer pipe and the plurality of fins in the flow direction of the combustion gas in the case to be in contact with the sidewall portion of the case, and serves to cool the sidewall portion of the case and prevent the sidewall portion from being thermally damaged. Water flowing through the trunk pipe and the heat transfer pipe is heated by the combustion gas and generated as hot water.

In the water heater, the outer end portions of the plurality of fins are provided in contact with the sidewall portion of the case, but these contact portions are separated from the trunk pipe, and the cooling effect using the trunk pipe is low. For this reason, heat transfer occurs from the plurality of fins to the sidewall portion of the case, which leads to concern that the temperature of the sidewall portion may become considerably high. When the water heater is used for a relatively long period of time, scale may adhere and be deposited on the inner surface of the heat transfer pipe. When such a phenomenon occurs, the heat exchange efficiency of the heat transfer pipe deteriorates, resulting in a decrease in the amount of heat transferred from the plurality of fins to the heat transfer pipe and a rise in the temperature of the plurality of fins. In such a case, the sidewall portion of the case is likely to become hotter. A rise in the temperature of the sidewall portion of the case causes, for example, thermal damage to parts attached to the case and a decrease in the heat exchange efficiency of the water heater, and thus it is desirable to eliminate such a problem appropriately.

As a means for eliminating the aforementioned defects, setting the outer end portions of the plurality of fins and the sidewall portion of the case in a non-contact state so as to create a gap therebetween can be considered.

However, a large amount of high-temperature combustion gas enters the above gap when such a configuration is adopted alone, which eventually leads to concern that the temperature of the sidewall portion of the case may become high. In addition, when a large amount of combustion gas enters the above gap and passes through the gap as it is, the amount of heat recovered by the plurality of fins is reduced, and thus the efficiency of heat exchange is more likely to decrease.

On the other hand, in the water heater disclosed in Patent Document 2, a portion of an auxiliary member (heat shield member) is joined to a trunk pipe, another portion of the auxiliary member serves as an extension portion extending from the position of the trunk pipe toward a plurality of fins, and the extension portion blocks at least a portion of a region between the trunk pipe and the plurality of fins. Therefore, the extension portion prevents a large amount of combustion gas from entering a gap between the plurality of fins and the sidewall portion of the case, and thus it is possible to prevent the temperature of the sidewall portion from becoming high to some extent.

However, according to Patent Document 2, a portion of the extension portion of the auxiliary member serves as an abutment portion that abuts the sidewall portion of the case, whereas a gap through which the combustion gas can enter is formed between the abutment portion and the outer end portions of the plurality of fins. Therefore, the abutment portion is heated by the combustion gas entering the gap, and as a result, the sidewall portion of the case is also heated. As a result, there is still room for improvement in properly and sufficiently preventing the temperature of the sidewall portion from becoming high.

The disclosure provides a heat exchanger capable of appropriately preventing the temperature of the sidewall portion of the case from becoming considerably high due to the influence of a heating gas such as a combustion gas, and a water heater equipped with the same.

The disclosure takes the following technical measures.

SUMMARY

According to a first aspect of the disclosure, there is provided a heat exchanger including: a case into which a heating gas is supplied; a heat transfer pipe which is disposed in the case and to which a plurality of fins is joined; a trunk pipe which is located further upstream than the plurality of fins in a flow direction of the heating gas in the case and provided in contact with a sidewall portion of the case; and an auxiliary member including a trunk pipe joint portion joined to the trunk pipe and an extension portion extending from the trunk pipe joint portion toward the plurality of fins, wherein the plurality of fins is provided at a position separated from the sidewall portion, the extension portion of the auxiliary member includes an entry portion that enters between the plurality of fins and the sidewall portion, and a first abutment portion which is provided in the entry portion and abuts outer end portions of the plurality of fins, and a space portion in which inflow of the heating gas is suppressed is formed between the first abutment portion and the sidewall portion.

In the disclosure, preferably, the extension portion of the auxiliary member further includes a bent portion which is bent from a portion separated from the sidewall portion of the case toward the sidewall portion, and a portion of which serves as a second abutment portion that abuts the sidewall portion.

In the disclosure, preferably, the heat transfer pipe includes a plurality of tubular body portions lined up at intervals in a direction intersecting the flow direction of the heating gas, a tubular body portion located closest to the trunk pipe among the plurality of tubular body portions is a specific tubular body portion, and the first abutment portion of the auxiliary member includes a region of the outer end portions of the plurality of fins, located further downstream than a center of the specific tubular body portion in the flow direction of the heating gas, in an abutment target region.

Preferably, the disclosure further includes a resin-made exhaust duct which is attached to the sidewall portion of the case at a position located further downstream than the auxiliary member in the flow direction of the heating gas, and used to discharge the heating gas after heat recovery by the plurality of fins and the heat transfer pipe, as an exhaust gas, from the inside of the case to the outside.

According to a second aspect of the disclosure, there is provided a water heater including: the heat exchanger provided in the first aspect of the disclosure; and a burner that supplies a combustion gas serving as the heating gas into the case of the heat exchanger.

BRIEF DESCRIPTION OF THE DRAWINGS

(a) of FIG. 7 and (b) of FIG. 7 are cross-sectional views of main parts illustrating another example of the disclosure.

DESCRIPTION OF THE EMBODIMENTS

According to such a configuration, the following effects can be obtained.

First, although the plurality of fins is heated to a high temperature by the heating gas, the plurality of fins is not in direct contact with the sidewall portion of the case, and thus there is no direct heat transfer from the plurality of fins to the sidewall portion. In addition, the extension portion of the auxiliary member is provided with the first abutment portion that abuts the outer end portions of the plurality of fins, and the space portion formed between the first abutment portion and the sidewall portion of the case is a region in which the inflow of the heating gas is suppressed and serves as a thermal insulation portion. Therefore, heat of the plurality of fins is also inhibited from being transferred to the sidewall portion through the first abutment portion of the auxiliary member. This makes it possible to appropriately prevent the temperature of the sidewall portion of the case from becoming considerably high under the influence of the heating gas.

Further, since the first abutment portion of the extension portion of the auxiliary member abuts the outer end portions of the plurality of fins, the heating gas does not enter between the first abutment portion and the plurality of fins, and thus it is possible to eliminate or reduce the uselessness of the heating gas traveling further downstream in the flow direction of the heating gas than the plurality of fins without acting on the plurality of fins. Therefore, it is also possible to suppress a decrease in the efficiency of heat exchange.

In addition, according to the disclosure, by covering the trunk pipe with the trunk pipe joint portion of the auxiliary member, it is also possible to prevent the trunk pipe from being directly exposed to the heating gas to thereby protect the trunk pipe. In addition, in a case where there is concern that strongly acidic condensed water may be generated when heat is recovered from the heating gas, the auxiliary member prevents the condensed water from directly adhering to the trunk pipe, and thus it is also possible to prevent the trunk pipe from being easily corroded by the condensed water.

According to such a configuration, since a portion of the extension portion of the auxiliary member is formed as a bent portion and is brought into contact with the sidewall portion of the case as the second abutment portion, it is possible to stabilize the attached state of the auxiliary member. Since the bent portion of the auxiliary member blocks a portion of the space portion formed between the first abutment portion of the auxiliary member and the sidewall portion of the case, it is more preferable in suppressing the entry and passage of the heating gas into and through the space portion.

According to such a configuration, the following effects can be obtained.

That is, it is possible to obtain the effect of suppressing a large amount of heat of the plurality of fins being transferred to the sidewall portion of the case through the second abutment portion of the auxiliary member. That is, among the plurality of fins, the temperature distribution in the periphery of the specific tubular body portion is such that the temperature is lower in the downstream portion than in the upstream portion in the flow direction of the heating gas. Therefore, according to the configuration, the first abutment portion of the auxiliary member abuts the plurality of fins including relatively low-temperature portions, and thus it is possible to lower the temperature of the second abutment portion that abuts the sidewall portion of the case. Therefore, it is possible to more reliably prevent the temperature of the sidewall portion from becoming high.

According to such a configuration, the temperature of the mounting location of the resin-made exhaust duct is prevented from becoming considerably high due to the heat transferred from the plurality of fins, and thus it is possible to appropriately avoid thermal damage to the exhaust duct. In a case where the exhaust duct is made of a resin, it is possible to achieve a reduction in weight, a reduction in manufacturing cost, and the like more than in a case where the exhaust duct is made of a metal.

According to such a configuration, it is possible to obtain the same effects as described for the heat exchanger provided in the first aspect of the disclosure.

Other features and advantages of the disclosure will become more apparent from the description of embodiments of the disclosure made below with reference to the accompanying drawings.

Hereinafter, preferred embodiments of the disclosure will be described in detail with reference to the accompanying drawings.

Figure 2:
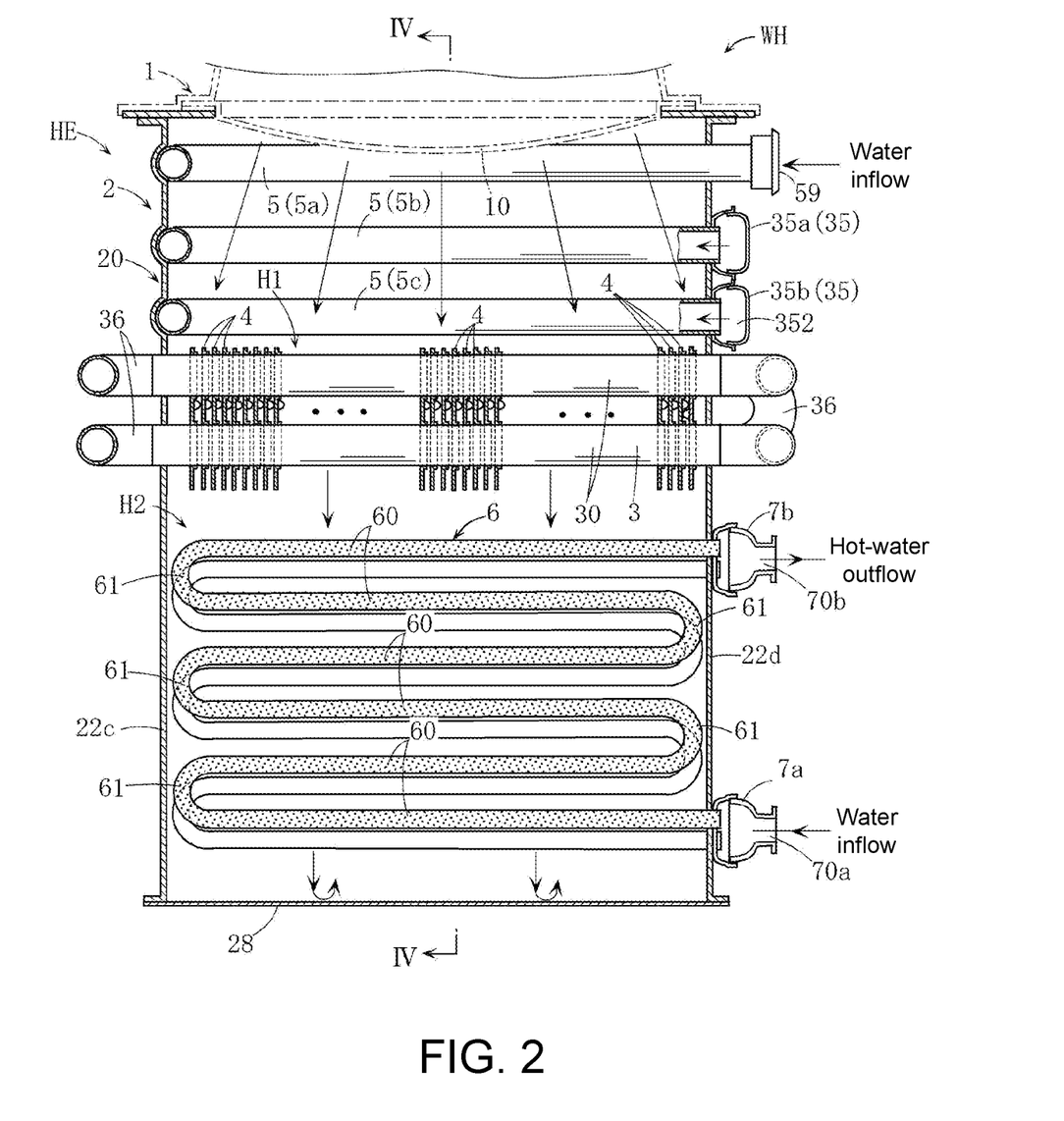
FIG. 2 is a cross-sectional view of main parts illustrating an example of a water heater in which the heat exchanger shown in FIG. 1 and a burner are combined, the portion of the heat exchanger being equivalent to a cross-sectional view along line II-II of FIG. 1.

A water heater WH shown in FIG. 2 is equipped with a heat exchanger HE and a burner 1 a portion of which is shown by a virtual line.

As the burner 1, for example, a conventionally known burner such as one disclosed in Patent Document 1 or 2 is used. In this burner 1, fuel gas is mixed with combustion air which is discharged from a fan (not shown), and this air-fuel mixture is injected into a case 2 through an air-fuel mixture injection member 10 having air permeability provided at the upper opening of the case 2 of the heat exchanger HE. The air-fuel mixture is ignited and a combustion gas serving as a heating gas is supplied downward into the case 2.

Sensible heat and latent heat are recovered from the combustion gas by primary and secondary heat exchange portions H1 and H2 to be described later, so that water supplied to these primary and secondary heat exchange portions H1 and H2 is heated, and the hot water generated by such heating is supplied to a desired hot water supply destination.

In FIGS. 1 to 4, in addition to the above case 2, the heat exchanger HE includes a plurality of trunk pipes 5, auxiliary members 8 (8a, 8b), a heat transfer pipe 3 and a plurality of plate-shaped fins 4 joined to the heat transfer pipe 3 constituting the primary heat exchange portion H1, a plurality of heat transfer pipes 6 constituting the secondary heat exchange portion H2, and an exhaust duct 29.

Among the parts of the heat exchanger HE, the exhaust duct 29 is made of a resin, whereas the other parts are made of, for example, stainless steel.

The heat transfer pipe 3 is equivalent to "a heat transfer pipe to which a plurality of fins is joined" referred to in the disclosure, but the heat transfer pipe 6 is not equivalent to this.

Figure 3:
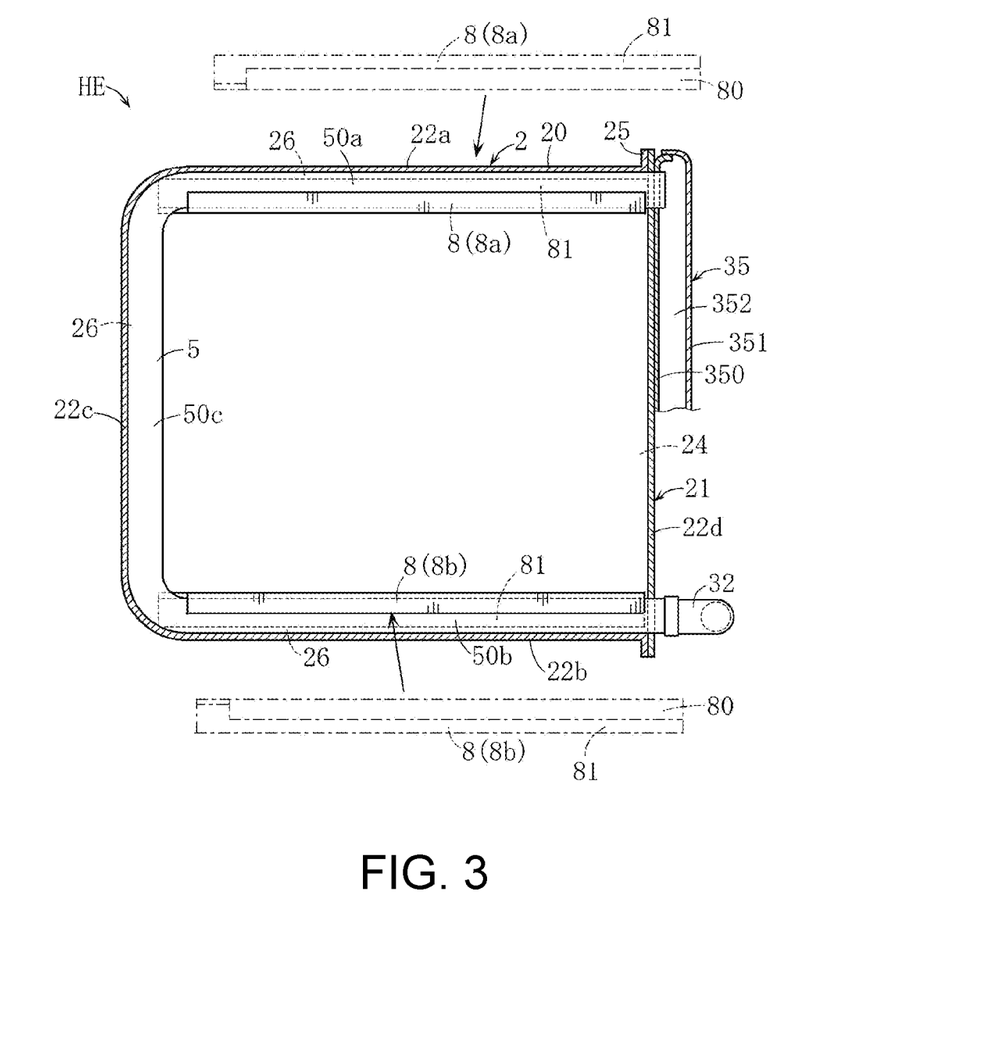
FIG. 3 is a cross-sectional view of main parts along line III-III of FIG. 1.

The case 2 has a substantially rectangular cylindrical shape with a bottom wall portion 28, and is configured with a case main body 20 and a case auxiliary plate portion 21 combined as clearly shown in FIG. 3. The case main body 20 includes a plurality of sidewall portions 22a to 22c connected to each other in substantially a lateral U shape in a plan cross sectional view, and has an opening 24 formed in one side portion. The case auxiliary plate portion 21 has a sidewall portion 22d which is joined in contact with a flange portion 25 provided on the case main body 20 and blocks the opening 24 on one side portion of the case main body 20.

Figure 1:
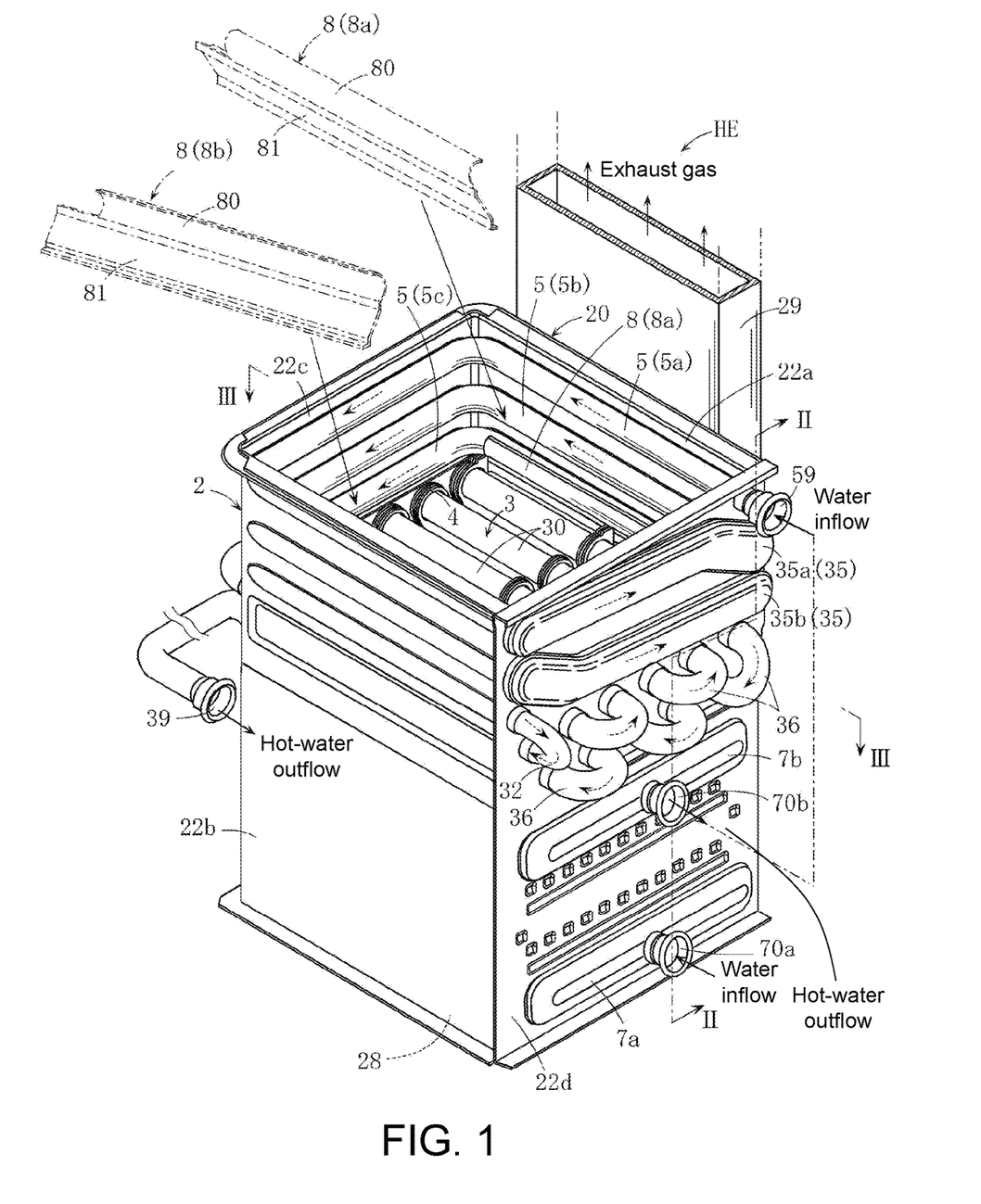
FIG. 1 is a perspective view illustrating an example of a heat exchanger according to the disclosure.

As shown in FIGS. 1 and 2, the heat transfer pipe 3 has a structure in which a plurality of straight tubular body portions 30 lined up at intervals in the width direction (horizontal direction) of the case 2 are lined up in two upper and lower stages and the ends of the plurality of tubular body portions 30 are connected to each other with a substantially U-shaped bend pipe 36 outside the case 2 interposed therebetween. In the heat exchanger HE of the present embodiment, hot water supplied from its water inlet 70a into the secondary heat exchange portion H2 is heated by passing through the secondary heat exchange portion H2 and then supplied to a water inlet 59 of the trunk pipe 5. Thereafter, the hot water that has passed through the trunk pipe 5 is fed into the heat transfer pipe 3 of the primary heat exchange portion H1, heated, and discharged from a hot-water outlet 39.

The plurality of fins 4 is used for heat absorption and is arrayed at appropriate intervals in the axial direction of the tubular body portion 30, and the tubular body portions 30 pass through and are joined to the plurality of fins 4 in a series. Each of the fins 4 is appropriately formed with a plurality of notched concave portions 47 for achieving uniform temperature distribution.

Each of the heat transfer pipes 6 is a meandering heat transfer pipe and has a meandering shape in which a plurality of straight tubular body portions 60 extending in a horizontal direction and lined up at intervals in a vertical height direction is connected to each other in a series with a plurality of connecting tubular body portions 61 which are semicircular in side view interposed therebetween, as shown in FIG. 2. The plurality of heat transfer pipes 6 is lined up at appropriate intervals in the width direction of the case 2 and is provided in a staggered array in which height differences are provided between the heat transfer pipes 6 adjacent to each other. In FIG. 2, two heat transfer pipes 6 are shown overlapping each other, and since it is difficult to distinguish between the two, one of them is marked with a halftone dot pattern.

Both ends of each of the heat transfer pipes 6 in the longitudinal direction are provided on the outer surface side of the sidewall portion 22d or are connected to header portions 7a and 7b for inflow and outflow of hot water. Hot water is supplied from the outside to the water inlet 70a of the header portion 7a, and the hot water heated by passing through the plurality of heat transfer pipes 6 is discharged from a hot-water outlet 70b of the header portion 7b and fed into the water inlet 59 of the trunk pipe 5 described above.

Figure 4:
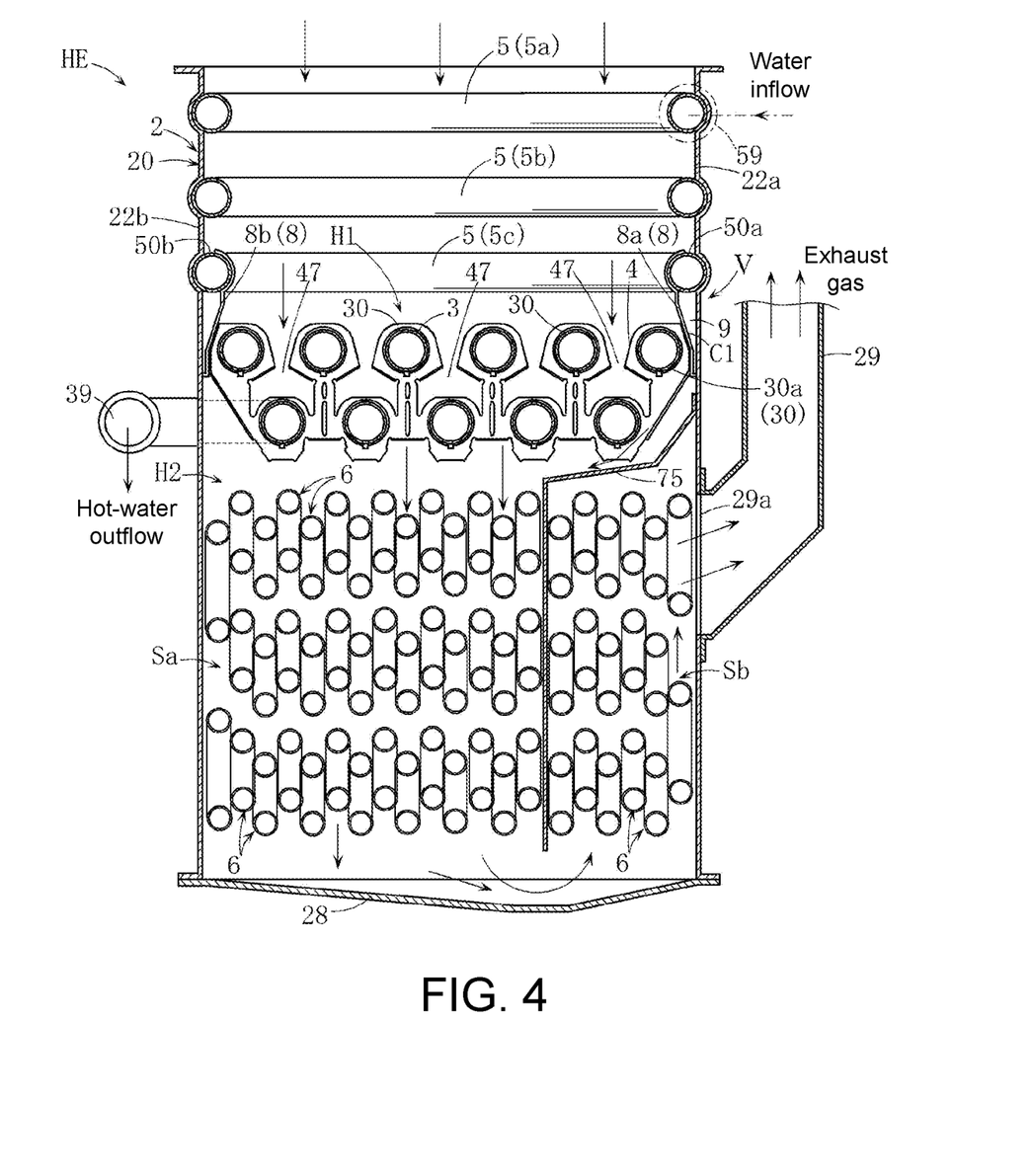
FIG. 4 is a cross-sectional view along line IV-IV of FIG. 2.

The exhaust duct 29 is a member for discharging the combustion gas after passing through the primary heat exchange portion H1 and the secondary heat exchange portion H2 to the outside of the case 2 as an exhaust gas and guiding it to a desired position. As shown in FIG. 4, this exhaust duct 29 is attached to the sidewall portion 22a of the case 2 so as to surround an exhaust port 29a provided in the sidewall portion 22a.

A partition wall portion 75 that divides the secondary heat exchange portion H2 into first and second regions Sa and Sb in the width direction of the case 2 is provided in the case 2, and the upper portion of this partition wall portion 75 is disposed to block the upper side of the second region Sb and then is joined to the sidewall portion 22a of the case 2. When the combustion gas that has passed through the primary heat exchange portion H1 travels downward through the first region Sa and reaches the bottom of the case 2, the combustion gas is guided upward by the bottom wall portion 28, enters the second region Sb, and reaches the exhaust port 29a and the exhaust duct 29.

The trunk pipe 5 is a member which is used for heating water and cooling the plurality of sidewall portions 22a to 22c of the case 2 to prevent them from being thermally damaged. The trunk pipe 5 has a structure in which a plurality of straight tubular body portions 50a to 50c is connected to each other in substantially a lateral U shape in a plan view. Meanwhile, the sidewall portion 22d of the case 2 is cooled by the hot water in header portions 35 to be described later, and cooling performed by the trunk pipe 5 is omitted.

The plurality of trunk pipes 5 is provided in a plurality of upper and lower stages in a region located further upward than the plurality of fins 4 and the heat transfer pipe 3, and is brazed in contact with the inner surfaces of the sidewall portions 22a to 22c of the case 2.

The case auxiliary plate portion 21 is provided with a plurality of header portions 35 (35a, 35b) for circulating hot water to the plurality of trunk pipes 5. Each of the header portions has a structure in which a cover member 351 is joined to a base member 350 joined to the outer surface of the sidewall portion 22d and a chamber 352 is formed inside the header portion, as shown in a partial cross section in FIG. 3. Both ends of the plurality of trunk pipes 5 (the outer ends of the straight tubular body portions 50a and 50b) pass through the sidewall portion 22d and are configured to communicate with the chamber 352, be provided with the water inlet 59, or be connected to the heat transfer pipe 3 through a bend pipe 32.

A hot-water path through the plurality of trunk pipes 5 is as follows.

That is, hot water supplied to the water inlet 59 at one end of the uppermost trunk pipe 5a passes through the trunk pipe 5a and flows into the upper header portion 35a. After that, after flowing into and passing through the second-stage trunk pipe 5b, the hot water flows into the lower header portion 35b and further flows into the third-stage trunk pipe 5c. The hot water that has passed through the trunk pipe 5c flows into the heat transfer pipe 3 through the bend pipe 32 and then reaches the hot-water outlet 39. The hot water is heated by the combustion gas in the process described above.

The auxiliary members 8 (8a, 8b) are members for suppressing a rise in the temperature of the sidewall portions 22a and 22b of the case 2 and improving the efficiency of heat exchange. In particular, the auxiliary member 8a is also useful for suppressing high temperature at the mounting location of the resin-made exhaust duct 29. These auxiliary members 8 are joined to the straight tubular body portions 50a and 50b of the lowermost trunk pipe 5 (5c) among the plurality of trunk pipes 5. As shown in FIG. 3, the auxiliary members 8a and 8b extend in the longitudinal direction of the straight tubular body portions 50a and 50b.

Figure 5:
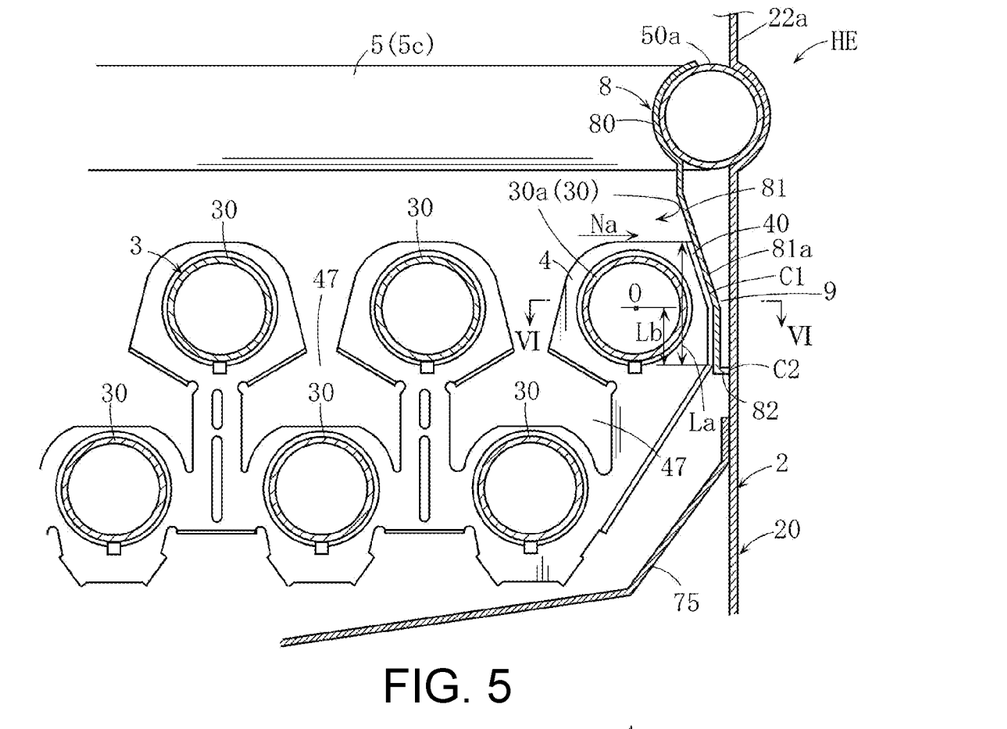
FIG. 5 is an enlarged view of a V part of FIG. 4.

As clearly shown in FIG. 5, the auxiliary member 8a includes a trunk pipe joint portion 80 and an extension portion 81.

The trunk pipe joint portion 80 has an arc shape in side view that fits into the inner circumferential side of the straight tubular body portion 50a of the trunk pipe 5 (surface on the central side in the case 2) so as to cover this inner circumferential side, and is joined to the straight tubular body portion 50a by means of brazing or the like.

The extension portion 81 of the auxiliary member 8a is a portion extending from the trunk pipe joint portion 80 toward the plurality of fins 4, and includes an entry portion 81a that enters between the plurality of fins 4 and the sidewall portion 22a of the case 2. The entry portion 81a includes a first abutment portion C1, a bent portion 82 connected to the tip side of the first abutment portion C1, and a second abutment portion C2 serving as a portion of the bent portion 82.

Outer end portions 40 of the plurality of fins 4 are separated from the sidewall portion 22a in the width direction of the case 2 and are disposed not to be in direct contact with the sidewall portion 22a. On the other hand, the first abutment portion C1 of the auxiliary member 8a abuts the outer surface of the upper region of the outer end portions 40 of the plurality of fins 4.

Figure 6:
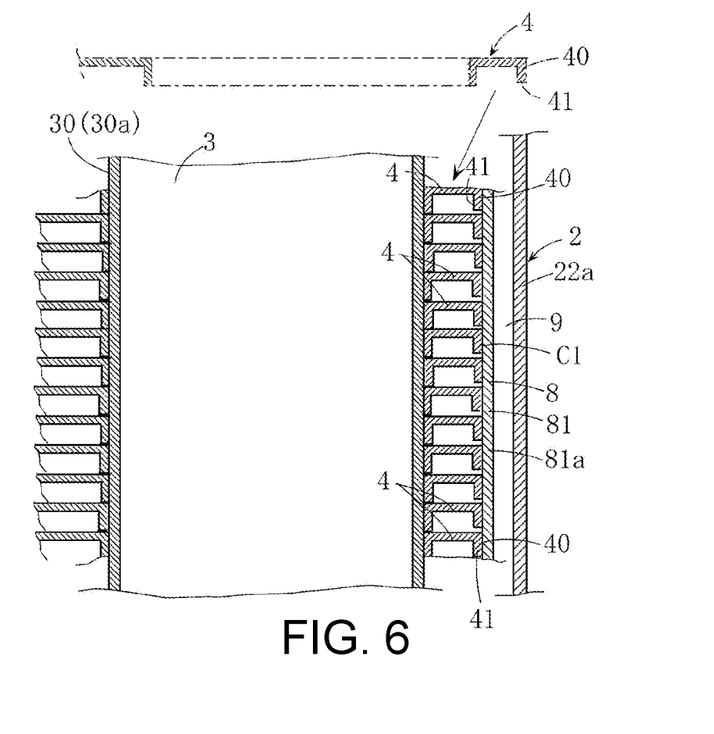
FIG. 6 is a cross-sectional view along line VI-VI of FIG. 5.

More specifically, as shown in FIG. 6, a bent piece portion 41 bent in the thickness direction of each fin 4 is connected to the outer end portion 40 of each fin 4, and the first abutment portion C1 is in surface contact with the outer surface of the bent piece portion 41. A space portion 9 is formed between the first abutment portion C1 and the sidewall portion 22a of the case 2. As shown in FIG. 5, the space portion 9 is a closed region surrounded by the auxiliary member 8a, the trunk pipe 5, and the sidewall portion 22a and is a region in which the inflow of combustion gas is suppressed.

The first abutment portion C1 abuts the range of an appropriate dimension La from the uppermost position of the outer end portions 40 of the plurality of fins 4 to the lower side thereof, whereas the lower tip portion of the first abutment portion C1 and the bent portion 82 are located further downward than a central portion O of a tubular body portion 30a of the heat transfer pipe 3 by an appropriate dimension Lb (the first abutment portion C1 includes a region of the outer end portions 40 of the plurality of fins 4, located further downstream than the center O of the tubular body portion 30a in the flow direction of combustion gas, in an abutment target region). Meanwhile, the tubular body portion 30a is a tubular body portion located closest to the straight tubular body portion 50a of the trunk pipe 5 among the plurality of tubular body portions 30 of the heat transfer pipe 3, and is equivalent to a specific example of a "specific tubular body portion" referred to in the disclosure.

The bent portion 82 of the auxiliary member 8a is a portion bent from the tip portion of the first abutment portion C1 toward the sidewall portion 22a, and the tip portion of the bent portion 82 is the second abutment portion C2 that abuts the sidewall portion 22a. Preferably, the second abutment portion C2 is brazed to the sidewall portion 22a. This allows the auxiliary member 8a to be reliably and firmly attached to the sidewall portion 22a and the trunk pipe 5.

The exhaust duct 29 is attached to the sidewall portion 22a at a position located further downward than the second abutment portion C2.

The extension portion 81 of the auxiliary member 8a is preferably elastically deformable in moderation in the width direction of the case 2, and when the plurality of fins 4 is heated by the combustion gas and is about to produce thermal expansion, for example, in the direction of an arrow Na in FIG. 5, the extension portion deforms in the same direction and allows thermal expansion of the plurality of fins 4. This can prevent large stress or distortion from being generated in the plurality of fins 4 and thus the heat transfer pipe 3. The presence of the space portion 9 helps to cause the extension portion 81 to elastically deform as described above.

The other auxiliary member 8b is joined to the straight tubular body portion 50b. The auxiliary member 8b is bilaterally symmetrical to the above-described auxiliary member 8a, and detailed description thereof will be omitted.

Next, the operation of the above-described heat exchanger HE and the water heater WH equipped with the same will be described.

The plurality of fins 4 is heated to a high temperature by the combustion gas, but the plurality of fins 4 is not in direct contact with the sidewall portion 22a of the case 2, and there is no direct heat transfer from the plurality of fins 4 to the sidewall portion 22a. The first abutment portion C1 of the auxiliary member 8a abuts the outer end portions 40 of the plurality of fins 4, and the space portion 9 having a thermal insulation function is formed between the first abutment portion C1 and the sidewall portion 22a of the case 2. Therefore, there is also no direct heat transfer from the plurality of fins 4 to the sidewall portion 22a through the first abutment portion C1.

The heat transferred from the plurality of fins 4 to the auxiliary member 8a through the first abutment portion C1 may be transferred to the sidewall portion 22a of the case 2 through the second abutment portion C2. However, the second abutment portion C2 is the tip portion of the bent portion 82 and has a small contact area (heat transfer area) with the sidewall portion 22a. Therefore, it is possible to reduce the amount of heat transferred from the second abutment portion C2 to the sidewall portion 22a.

In addition, as already mentioned, the first abutment portion C1 includes a region, located further downstream than the center O of the tubular body portion 30a (30) of the heat transfer pipe 3 in the flow direction of the combustion gas, in the abutment target region. However, in the temperature distribution of the plurality of fins 4, there is a strong tendency for the temperature to be higher in the upper region which is on the upstream side in the flow direction of the combustion gas, and for the temperature to be lower in the lower region. In the periphery of the tubular body portion 30a, the temperature is lower on the lower side of the center O than on the upper side thereof. Since the first abutment portion C1 abuts such a lower temperature portion, the second abutment portion C2 that abuts the sidewall portion 22a of the case 2 is prevented from becoming hotter toward the upper region of the plurality of fins 4.

This makes it possible to appropriately prevent the lateral region of the plurality of fins 4 and the lower region thereof in the sidewall portion 22a of the case 2 from becoming considerably hot under the influence of the heat of the plurality of fins 4. Although the exhaust duct 29 is made of a resin, a rise in temperature at the mounting location of the exhaust duct 29 is suppressed, and thus it is also possible to appropriately prevent the exhaust duct 29 from being thermally damaged.

The extension portion 81 of the auxiliary member 8a includes the first abutment portion C1 that abuts the outer end portions 40 of the plurality of fins 4, and thus it is possible to prevent the combustion gas from entering between the first abutment portion C1 and the outer end portions of the plurality of fins 4. Unlike the present embodiment, in a case where the auxiliary member 8a is configured not to include the first abutment portion C1, a large amount of combustion gas enters a region between the outer end portions 40 of the plurality of fins 4 and the extension portion 81 of the auxiliary member 8a, resulting in uselessness of downward passage. On the other hand, according to the present embodiment, it is also possible to eliminate such uselessness and to improve the efficiency of heat exchange.

Since the trunk pipe joint portion 80 of the auxiliary member 8a covers the straight tubular body portion 50a of the trunk pipe 5, the straight tubular body portion 50a is prevented from being directly exposed to the heating gas, and the effect of protecting it is also obtained. In addition, strongly acidic condensed water is generated when heat is recovered from the combustion gas, but the direct adhesion of this condensed water to the straight tubular body portion 50a is also prevented by the auxiliary member 8a. Therefore, it is also possible to prevent the straight tubular body portion 50a from being easily corroded due to the condensed water.

Although the sidewall portion 22b of the case 2 is not provided with the exhaust duct 29, the auxiliary member 8b is provided corresponding to the sidewall portion 22b. According to this auxiliary member 8b, the same effect as that obtained by the auxiliary member 8a can be obtained, and a rise in the temperature of the sidewall portion 22b can be suppressed.

Figure 7:
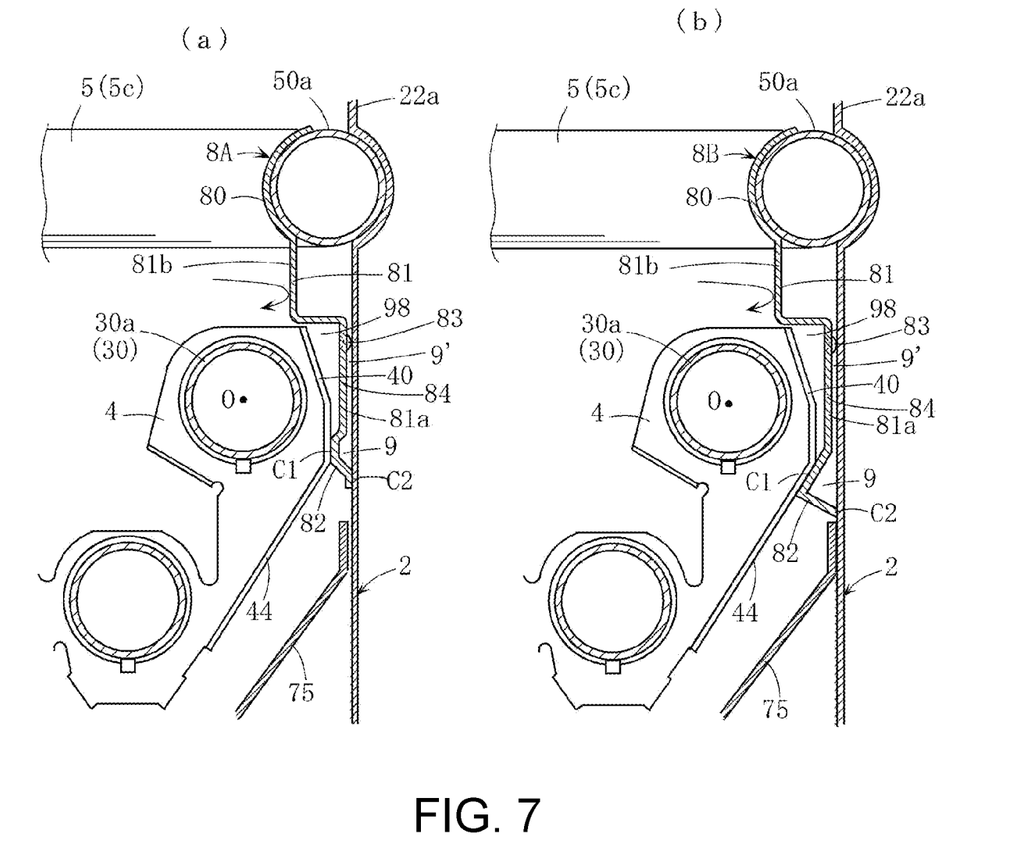

FIG. 7 shows another embodiment of the disclosure. In the drawing, elements identical or similar to those in the above embodiment are denoted by the same reference numerals and signs as in the embodiment, and repeated description thereof will be omitted.

In the embodiment shown in (a) of FIG. 7, the entry portion 81a of the extension portion 81 of an auxiliary member 8A that enters between the outer end portions 40 of the plurality of fins 4 and the sidewall portion 22a of the case 2 has a facing portion 84 that faces the outer end portion with a gap 98 interposed therebetween, and the first abutment portion C1 and the bent portion 82 are provided on the lower side of the facing portion 84. A region 81b near the base of the extension portion 81 of the auxiliary member 8A blocks a region between the trunk pipe 5 and the plurality of fins 4, and thus the combustion gas is prevented from entering the gap 98 from the center side of the case 2.

A region of the outer end portions 40 of the plurality of fins 4 on which the first abutment portion C1 abuts is formed as a region having a narrow area located further downward than the center O of the tubular body portion 30a. This prevents the temperature of the auxiliary member 8A from becoming high due to heat transfer from the plurality of fins 4 to the auxiliary member 8A.

A gap 9' which is located on the upper side of the space portion 9 and communicates with the space portion 9 is formed between the facing portion 84 of the auxiliary member 8A and the sidewall portion 22a of the case 2, and the gap 9' exhibits a thermal insulation property as in the space portion 9. Meanwhile, the gap 9' is formed, for example, by a small projection-shaped step-pressing convex portion 83 provided on the facing portion 84 of the auxiliary member 8A abutting the sidewall portion 22a. The step-pressing convex portion 83 can also be configured to be provided on the sidewall portion 22a side instead of on the auxiliary member 8A side. In a case where such a step-pressing convex portion 83 is used as a means for forming the gap 9', the contact area between the auxiliary member 8A and the sidewall portion 22a is reduced, and thus it is possible to reduce the amount of heat transferred from the auxiliary member 8A to the sidewall portion 22a and to control the dimension of the gap 9' appropriately.

According to the present embodiment, it is possible to suppress a rise in the temperature of the sidewall portion 22a as in the embodiment.

An auxiliary member 8B of the embodiment shown in (b) of FIG. 7 differs from the auxiliary member 8A shown in (a) of FIG. 7 in the position and shape of the first abutment portion C1. More specifically, the outer end portions 40 of the plurality of fins 4 is formed with an inclined portion 44 of which the height decreases toward the center of the case 2 in its width direction. In the auxiliary member 8A, the first abutment portion C1 does not abut the inclined portion 44 and abuts a region located further upward than the inclined portion, while in the auxiliary member 8B, the first abutment portion C1 is provided in a position and shape that abuts the inclined portion 44.

In the present embodiment, the same effect as in the previous embodiment shown in (a) of FIG. 7 is also obtained.

The disclosure is not limited to the content of the embodiments described above. The specific configuration of each part of the heat exchanger and the water heater according to the disclosure can be designed and modified in various ways within the scope intended by the disclosure.

At least one auxiliary member needs to be provided as the auxiliary member, and a plurality of auxiliary members may not necessarily be provided. For example, for the purpose of preventing thermal damage to the exhaust duct, it is also possible to adopt a configuration in which only one auxiliary member is provided in a region corresponding to the exhaust duct.

The specific shapes, sizes, materials, and the like of the auxiliary member, the case, the trunk pipe, the fin, and the heat transfer pipe are not also limited. The trunk pipe can also be, for example, a spiral pipe having a substantially rectangular shape in a plan view.

In the above-described embodiment, the exhaust duct is attached to the sidewall portion of the case. Unlike this, for example, it is also possible to adopt a configuration in which the case is formed in a bottom opening shape and the exhaust duct is connected to the bottom opening. The heat exchanger according to the disclosure can also be configured not to be provided with the secondary heat exchange portion for latent heat recovery.

Although the water heater of the above-described embodiment is a reverse combustion type in which the burner is disposed on the upper side of the heat exchanger, there is no limitation thereto, and it is also possible to adopt, for example, a forward combustion type in which the burner is disposed on the lower side of the heat exchanger.

The heating gas is not limited to combustion gas, and can also be, for example, a high-temperature exhaust gas or the like which is generated in a cogeneration system.

The water heater referred to in the disclosure has a function of heating water to generate hot water, and also includes, for example, a bath hot-water supply device, a water heater for indoor heating, a water heater for snow melting, and the like in addition to general hot-water supply devices.

What is claimed is:

1. A heat exchanger comprising:
   a case into which a heating gas is supplied;
   a heat transfer pipe which is disposed in the case and to which a plurality of fins is joined;
   a trunk pipe which is located further upstream than the plurality of fins in a flow direction of the heating gas in the case and provided in contact with a sidewall portion of the case; and
   an auxiliary member including a trunk pipe joint portion joined to the trunk pipe and an extension portion extending from the trunk pipe joint portion toward the plurality of fins,
   wherein the plurality of fins is provided at a position separated from the sidewall portion,
   the extension portion of the auxiliary member includes an entry portion that enters between the plurality of fins and the sidewall portion, and a first abutment portion which is provided in the entry portion and abuts outer end portions of the plurality of fins, and
   a space portion in which inflow of the heating gas is suppressed is formed between the first abutment portion and the sidewall portion;
   wherein the heat exchanger further comprises: a resin-made exhaust duct which is attached to the sidewall portion of the case at a position located further downstream than the auxiliary member in the flow direction of the heating gas, and used to discharge the heating gas after heat recovery by the plurality of fins and the heat transfer pipe, as an exhaust gas, from the inside of the case to the outside.

2. The heat exchanger according to claim 1, wherein the extension portion of the auxiliary member further includes a bent portion which is bent from a portion separated from the sidewall portion of the case toward the sidewall portion, and a portion of which serves as a second abutment portion that abuts the sidewall portion.

3. The heat exchanger according to claim 2, wherein the heat transfer pipe includes a plurality of tubular body portions lined up at intervals in a direction intersecting the flow direction of the heating gas, and a tubular body portion located closest to the trunk pipe among the plurality of tubular body portions is a specific tubular body portion, and
   the first abutment portion of the auxiliary member includes a region of the outer end portions of the plurality of fins, located further downstream than a center of the specific tubular body portion in the flow direction of the heating gas, in an abutment target region.

4. A water heater comprising:
   the heat exchanger according to claim 3; and
   a burner that supplies a combustion gas serving as the heating gas into the case of the heat exchanger.

5. A water heater comprising:
   the heat exchanger according to claim 2; and
   a burner that supplies a combustion gas serving as the heating gas into the case of the heat exchanger.

6. A water heater comprising:
   the heat exchanger according to claim 1; and
   a burner that supplies a combustion gas serving as the heating gas into the case of the heat exchanger.

* * * * *